Figure 1:
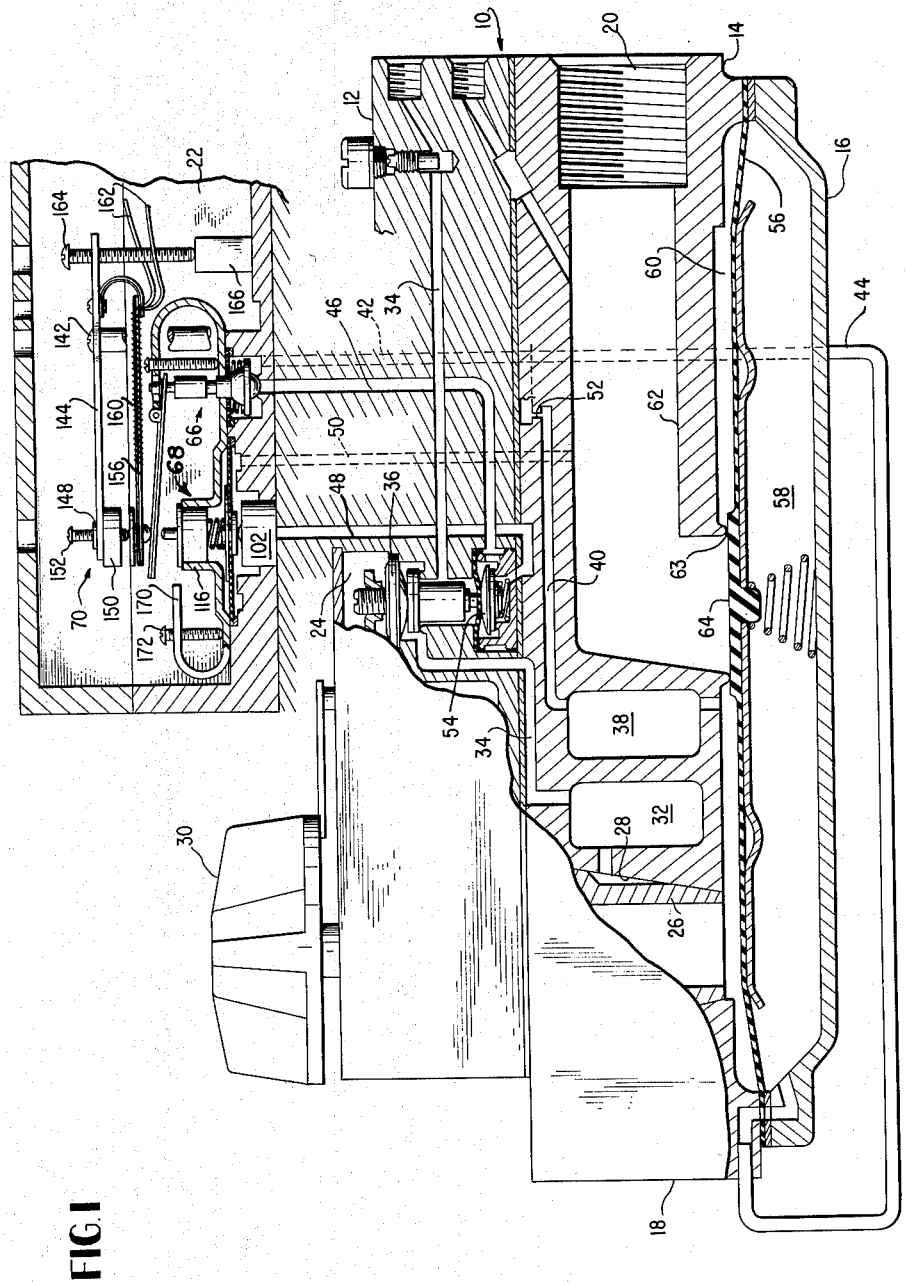

Jan. 4, 1966 R. W. HOUSER 3,227,370
TEMPERATURE RESPONSIVE CONTROL DEVICE
Filed May 10, 1963 2 Sheets-Sheet 1

INVENTOR.
ROY W. HOUSER
BY
Browne, Schuyler and Beveridge
ATTORNEYS

Jan. 4, 1966 R. W. HOUSER 3,227,370
TEMPERATURE RESPONSIVE CONTROL DEVICE
Filed May 10, 1963 2 Sheets-Sheet 2

INVENTOR.
ROY W. HOUSER
BY
Browne, Schuyler and Beveridge
ATTORNEYS

United States Patent Office 3,227,370
Patented Jan. 4, 1966

3,227,370
TEMPERATURE RESPONSIVE CONTROL DEVICE
Roy W. Houser, Orange, Calif., assignor to Robertshaw Controls Company, Richmond, Va., a corporation of Delaware
Filed May 10, 1963, Ser. No. 279,572
10 Claims. (Cl. 236—48)

This invention relates to control devices for heating systems or the like having fluid fuel burners, and particularly to control devices for operating a fuel burner in response to varying conditions within a region heated by the burner.

This invention is particularly suited for use in the type of control disclosed in the copending application Serial No. 252,335 of Marvin M. Graham, John W. Wright and Henry C. Braucksiek, assigned to the assignee of this invention, but is not limited to this particular use.

In the latter application, a combination control is disclosed in which fuel flow to the main burner is controlled by a pressure responsive valve subject on one side to main fuel pressure and on the other side to the pressure in a bleed line connected between the inlet and outlet of the control. Flow through the bleed line is turned on and off by a control valve in response to temperature changes in the zone or room heated by the main burner. When the control valve is open, a pressure regulator controls the rate of flow through the bleed line. When the control valve is closed, the bleed line pressure is the same as the main fuel pressure and the pressure responsive valve closes. When the control valve is open, the pressure responsive valve modulates flow to the main burner in response to variations in the rate of flow through the bleed line.

The present invention may be employed to operate the bleed line control valve of the Graham et al application between its on and off positions while simultaneously proportionally adjusting the pressure regulator in accordance with temperature variations so that flow to the main burner varies in accordance with temperature changes at the zone heated thereby.

It is an object of this invention to provide a control device which will open and close a fuel passage at selected temperatures and vary the rate of flow through the passage in accordance with temperature variations when the passage is open.

A further object is to provide a control device having a fuel passage in which flow through the passage is automatically turned on and off at selected temperatures by a control valve, and in which the rate of flow through the passage when the control valve is open is proportionally adjusted in accordance with temperature variations.

Still another object is to provide a control device in which fuel flow to a pressure regulator is turned on with a snap action at a first selected temperature with the biasing force on the pressure regulator thereafter being proportionally adjusted in accordance with temperature changes to vary the rate of flow through the passage until the temperature reaches a second selected value at which flow through the passage is shut off.

Another object lies in the provision of an electrical actuator for a fuel control device in which the actuator is held in an inoperative position until the temperature attains a selected value at which temperature the electrical actuator will simultaneously snap-actuate a control valve to open the fuel passage to a pressure regulator and thereafter exert a biasing force on the pressure regulator which varies in accordance with temperature changes, the operator returning to an inoperative position when the temperature attains a second selected value.

The foregoing and other objects are achieved by the provision of a body member having a fuel passage communicating between its inlet and outlet with a pressure regulator having a normally closed inlet valve. Disposed between the inlet of the passage and the pressure regulator is a control valve which is biased to a closed position to shut off flow through the passage to the pressure regulator.

Axially spaced relative to the pressure regulator is a permanent magnet, and a bimetallic lever has its free end disposed to move between the magnet and the plunger of the pressure regulator. Carried by the free end of the bimetallic lever is a magnetically responsive keeper which, due to the attraction of the magnet, urges the free end of the bimetallic lever toward an inoperative position in engagement with the magnet. When the temperature acting in the bimetallic lever increases, it tends to deflect away from the magnet toward engagement with the pressure regulator, and when the forces are sufficient to overcome the magnetic attraction, the free end of the bimetallic lever is released from the magnet and engages the pressure regulator with a snap action.

For actuating the control valve, an operating lever is pivotally supported between its ends with one end positioned to engage the control valve and the other end disposed in the path of the free end of the bimetallic lever. Consequently, when the keeper is released by the magnet, the bimetallic lever causes the operating lever to pivot about its fulcrum and open the control valve with a snap action, the control valve remaining open until the bimetallic lever returns to its inoperative position. So long as the control valve is open with the bimetallic lever exerting a biasing force on the pressure regulator, flow through the pressure regulator is adjusted in accordance with temperature variations acting on the bimetallic lever.

Figure 2:
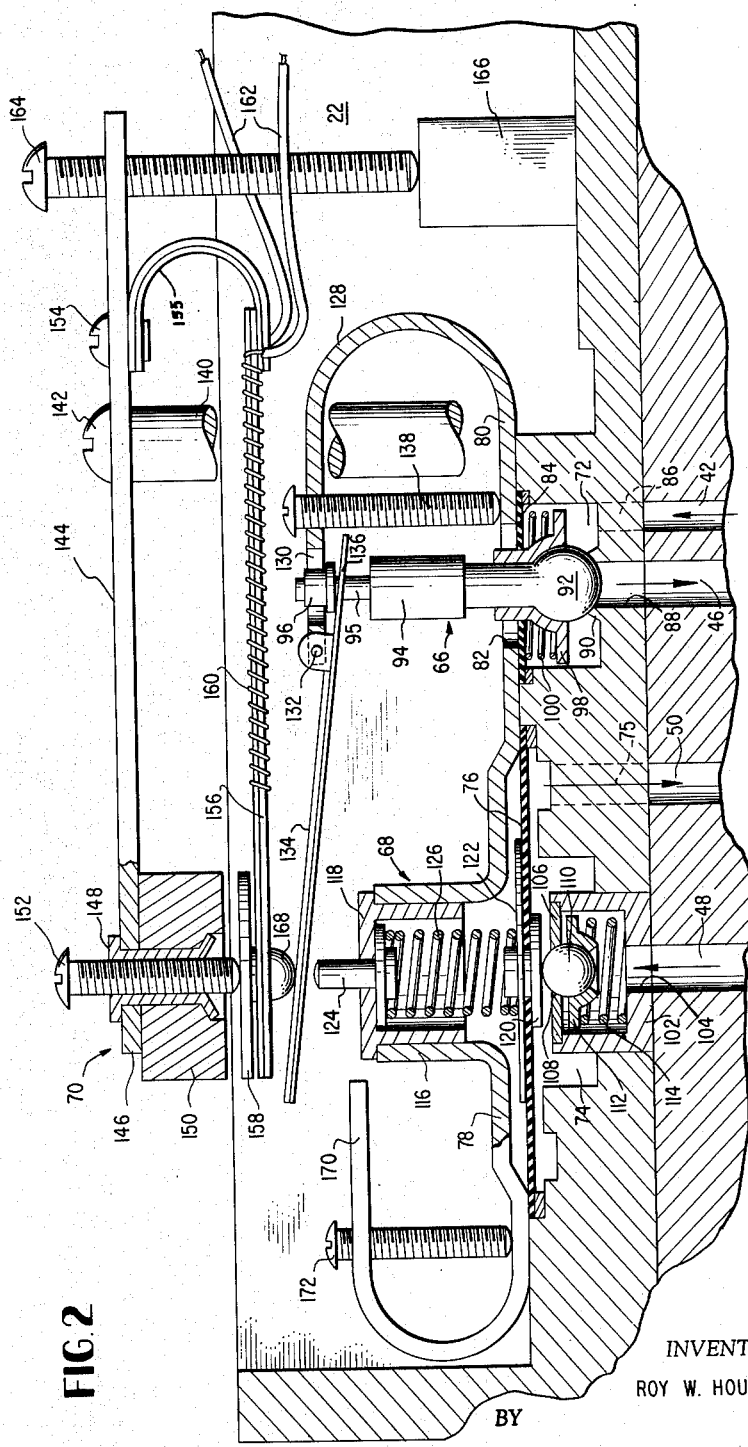

Other objects and advantages will become apparent from the following description taken in connection with the accompanying drawings in which FIG. 1 is a schematic sectional view of a combination control embodying the invention and FIG. 2 is an enlarged detailed view of the invention embodied in its preferred form.

With reference to FIG. 1, a combination control of the type disclosed in the previously discussed Graham et al. application Serial No. 252,335 is illustrated as comprising a casing 10 made up of upper, lower and middle sections or castings 12, 14 and 16, respectively. Middle section 14 is formed with an inlet 18 for connection with a fuel source and an outlet 20 for connection with a main fuel burner. Upper section 12 is formed with a compartment 22 for housing actuating mechanism for the control valve and pressure regulator, and a compartment 24 containing a pilot valve and pilot valve actuating mechanism. Casting 12 is also formed with a cavity for receiving a gas cock 26 which is seated in a conical valve seat 28 formed in casting 14 and provided with an adjusting knob 30.

By rotating adjustment knob 30, gas cock 26 can be moved between "pilot gas only," "on" and "off" positions. When gas cock 26 is in the "pilot" position, fuel is admitted from inlet 18 through a pilot filter cavity 32 to a pilot passage 34 which is connected with a pilot burner. Pilot passage 34 is controlled by a pilot valve 36 which may be manually opened to permit the pilot burner to be ignited and which is provided with actuating mechanism thermally responsive to the pilot burner flame to maintain the pilot valve in the open position so long as the pilot burner is lit. After ignition of the pilot burner, gas cock 26 may then be rotated to the "on" position admitting fuel through bleed line filter cavity 38 to a bleed line consisting of bleed passages 40, 42, 44, 46, 48 and 50. Communication between bleed passage 46 and bleed passage 48 is controlled by a bleed valve 54 operated by the pilot valve 36. When pilot valve 36 is in its closed position, an override plunger urges bleed valve 54 against its seat to shut off flow through the bleed passage. The pilot-bleed valve assembly and its method of operation is more fully described in the previously referred to Graham et al. application and reference may be had to that application for a complete description of its operation.

Secured at its periphery between castings 14 and 16 is a flexible diaphragm 56 which forms a sensing chamber 58 beneath the diaphragm and an inlet chamber 60 between the diaphragm and casting 14. Outlet 20 is connected with inlet chamber 60 by a main passage 62 having an annular valve seat 63 formed about its inlet in chamber 60. Integrally formed on diaphragm 56 is a valve 64 which cooperates with valve seat 63 to control communication between inlet 18 and outlet 20 through main passage 62. Fuel flow from inlet chamber 60 through outlet 20 is therefore controlled in accordance with variations in the pressure differential between chambers 58 and 60.

When the pressures in chambers 58 and 60 are equal, valve 64 is biased into engagement with valve seat 63 to shut off communication between inlet chamber 60 and main passage 62. Assuming that gas cock 26 is in the "on" position, when the bleed line is closed, the pressure in bleed passage 40, 42 and 44 is the same as inlet pressure and consequently, since passage 44 communicates with chamber 58, the pressure in chamber 58 is the same as that in chamber 60 and valve 64 remains closed. However, with all of the bleed passages open, fuel flows through bleed passage 40 across a restriction 52, through passages 42, 46, 48 and 50 to main passage 62. The pressure drop across restriction 52 causes a corresponding reduction of pressure in chamber 58 with the result that valve 64 opens to connect inlet 18 with outlet 20 through passage 62. Consequently, the rate of flow through main passage 62 to the main burner varies in accordance with the rate of flow through the bleed line. Reference may be had to the previously referred to Graham et al. application for a complete description of the operation of the apparatus described above.

When the pilot burner is ignited and gas cock 26 is in the "on" position, flow through the bleed line is turned on and off by a control valve 66, the rate of flow being controlled by a pressure regulator 68 when control valve 66 is open. Control valve 66 and pressure regulator 68 are actuated by a temperature responsive actuating mechanism identified generally by reference numeral 70.

Formed in the bottom wall of compartment 22 (FIG. 2) is a control valve chamber 72 and a pressure regulating chamber 74. The upper wall of chamber 74 is formed by a flexible diaphragm 76 secured at its periphery to the bottom wall of compartment 22 by a cover member 78.

Cover member 78 is provided with an extension 80 having an aperture 82 which overlies chamber 72. Extension 80 cooperates with the bottom wall of compartment 22 to secure a sealing diaphragm 84 at its periphery to the compartment wall. Diaphragm 84 forms the upper wall of control valve chamber 72. Chamber 72 is provided with an inlet port 86 which communicates with bleed passage 42, and an outlet port 88 which communicates with bleed passage 46. Outlet port 88 is formed with an annular valve seat 90.

Control valve 66 is carried by sealing diaphragm 84 and is formed with a spherical valve element 92 which cooperates with valve seat 90 to control communication between inlet port 86 and outlet port 88. Extending from valve element 92 is a valve stem 94 with a flanged cap 96 mounted on its upper end. Mounted on valve element 92 and stem 94 is a flanged spring seat member 98 which receives one end of a spring 100, the other end of which is seated against the upper wall of chamber 72. Spring 100 biases valve element 92 of control valve 66 to its closed position against seat 90 to shut off communication between ports 86 and 88.

Mounted in the lower wall of pressure regulating chamber 74 is a valve housing 102 having an inlet port 104 which communicates with passage 48. Housing 102 has an upper wall 106 formed with a port 108 controlled by a ball valve 110 supported on a flanged spring seat member 112. Valve 110 is biased to close port 108 by a spring 114 seated between member 112 and the lower wall of housing 110.

Integrally formed on cover member 78 is a sleeve 116, the upper end of which is closed by an apertured cap member 118 threadedly connected with sleeve 116. Diaphragm 76 is apertured at its central portion to receive the stem of a valve operating member 120 which cooperates with a diaphragm plate 122 to clamp the central portion of the diaphragm between member 120 and plate 122.

Slidably mounted in the aperture of cap 118 is a piston plunger 124 which is supported on one end of a spring 126, the other end of which is seated on diaphragm plate 122. Thus, depression of piston 124 increases the biasing force of spring 126 tending to unseat valve 110 and admit fluid pressure into chamber 74. Accordingly, when the pressure in chamber 74 exerts a force on diaphragm 76 sufficient to overcome the biasing force of spring 126, valve 110 will seat against port 108 and shut off the flow into the pressure regulator.

Integrally formed on the end of extension 80 is a support member 128 in the form of a reverse curved section with a bifurcated end portion 130 axially disposed above control valve chamber 72 to receive stem 94 of control valve 66. Fulcrumed at 132 between the opposed outer ends of the bifurcated portion is an operating lever 134. Operating lever 134 is formed with a notched or bifurcated end 136 which receives reduced portion 95 of the control valve stem. It is apparent that counter clockwise rotation of lever 134 about pivot 132 will cause portion 136 to engage cap 96 and lift valve element 92 from valve seat 90 to connect port 86 with port 88. It is also apparent that such counterclockwise movement will cause the opposite end of lever 134 to press against piston plunger 124 to increase the biasing force of spring 126 on diaphragm 76.

Threadedly mounted in support member 128 is an adjustment screw 138 with its end engageable with the top of extension 80. By rotating screw 138, support member 128 may be deflected upwardly or downwardly to adjust the position of pivot 132 with respect to control valve 66.

Mounted in compartment 22 on posts 140 by screws 142 is a support arm 144, one end 146 of which is axially disposed above piston plunger 124. Secured to end 146 by a hollow, internally threaded rivet 148 is a permanent magnet 150. Threadedly received in hollow rivet 148 is a magnetic gap adjustment screw 152 for a purpose to be presently described.

Mounted on support arm 144 by screws 154 is a U-shaped bimetal element 155, on which is mounted a bimetallic lever 156 which extends beneath the support arm with its free end disposed beneath magnet 150. Secured to the free end of bimetallic lever 156 is a magnetically responsive keeper member 158 which serves to urge the bimetallic lever into engagement with the end of adjustment screw 152 in response to attraction of magnet 150. As viewed in FIG. 2, the high expansion side of bimetallic lever 156 preferably is the upper side, so that upon heating of the bimetal it will tend to deflect in a downward direction away from magnet 150. To compensate for ambient temperature variations, the U-shaped bimetal element 155 is disposed with its high expansion side opposite to the high expansion side of bimetallic lever 156. Thus, increases in ambient temperature will tend to cause the end of element 155 to which bimetallic lever 156 is secured to move upwardly as viewed in FIG. 2, while the free end of lever 156 will tend to move downwardly. Consequently, the free end of lever 156 adjacent the magnet will remain relatively stationary irrespective of ambient temperature variations.

Bimetallic lever 156 may be wound with a suitably insulated resistance coil 160 connected through lead wires 162 with a thermostat subject to the temperature in a room or other area heated by the main burner. Coil 160 is preferably connected with the thermostat in such a manner that as the temperature decreases in the area of the thermostat, current will be delivered to the bimetallic lever through coil 160 to increase the temperature acting on the bimetallic lever. In other words, the temperature acting on the bimetallic lever is inversely proportional to the temperature sensed by the room thermostat.

Threadedly mounted in the end of support arm 144 opposite magnet 150 is an adjustment screw 164 with its lower end engageable with a support or boss 166. By rotating adjustment screw 164, the position of lever 156 may be adjusted relative to magnet 150 and operating lever 134.

Extending from the lower side of keeper 158 is a projection 168 which is engageable with operating lever 134. Downward movement of keeper 158 will cause counter-clockwise rotation of operating lever 134 about pivot 132, causing the operating lever to engage piston plunger 124 and exert a force in a downward direction on spring 126. For limiting the downward movement of operating lever 134, a limit stop 170 integrally formed on cover member 78 projects into the path of lever 134. The position of limit stop 170 may be adjusted by a screw 172 engaged with the top of cover 78. Rotation of screw 172 will cause slight bending of the curved portion of stop member 170 to adjust the vertical position of the limit stop.

In FIG. 2, bimetallic lever 156 is held by magnet 150 in its inoperative position in which it is disengaged from operating lever 134 and plunger 124. Magnet 150 holds bimetallic lever 156 in the inoperative position so long as the temperature sensed by the thermostat is above the set temperature. As the temperature decreases at the thermostat, the flow of current to resistance coil 160 increases to heat the bimetal. The resulting temperature increase tends to cause the bimetallic lever to deflect downwardly against the attraction of magnet 150. When the heat accumulates to the point where the deflecting forces are sufficient to overcome the magnetic attraction, keeper 158 is released by the magnet and bimetallic lever 156 deflects downwardly with a snap action. As a result of the rapid downward movement, projection 168 simultaneously snap actuates control valve 66 to its open position and engages plunger 124 to compress spring 126. Further heating of bimetallic lever 156 increases the biasing forces acting downwardly on valve 110 pushing it away from its seat to open port 108. While in its operative position, bimetallic lever 156 maintains control valve 66 in its open position through operating lever 134 and proportionally adjusts the biasing force on regulating valve 110 in accordance with temperature variations acting on the bimetallic lever.

As soon as the bleed line is opened by control valve 66 and regulating valve 110, restriction 52 (FIG. 1) causes a pressure drop in chamber 58 causing valve 64 to open and supply fuel to the main burner, which is ignited by the pilot burner (not shown).

As the temperature sensed by the thermostat increases, the flow of current to coil 160 decreases to lower the temperature acting on the bimetallic lever. As the bimetallic lever cools, keeper 158 moves toward magnet 150. After the end of bimetallic lever 156 moves into the field of the magnet, the magnetic attraction increases rapidly as keeper 158 approaches the magnet, until the point is reached where the magnetic forces overcome the deflecting forces on lever 156, and keeper 158 snaps into engagement with screw 152 to simultaneously disengage from plunger 124 and release control valve 66.

When keeper 158 is in the inoperative position against the lower end of screw 152, the magnetic attraction is at a maximum. Consequently, the forces required to deflect bimetallic lever downwardly must be greater than would be necessary when the keeper is only slightly spaced from screw 152. Therefore, the temperature acting on the bimetal when keeper 158 snaps from the operative to inoperative position will generally be somewhat less than the temperature required to actuate keeper 158 in the opposite direction, i.e. from the inoperative to operative position. Advancing screw 152 in rivet 148 increases the distance from the magnet at which keeper 158 will engage the end of screw 152 to assume its inoperative position. As a result, the temperature differential between opening and closing of control valve 66 will be lowered since less force is required to separate keeper 158 from screw 152 as the distance from the magnet to the point of contact is increased.

While a specific embodiment of the invention has been illustrated, it should be understood that the invention is not limited to the identical construction shown but various alterations and modifications in the construction and arrangements of parts is possible without departing from the scope and spirit of the invention.

What is claimed is:

1. In a combination control having a body with a passage for conducting fluid fuel from an inlet to an outlet,
 a control valve in the passage movable between open and closed positions,
 a pressure regulator communicating with the passage between the control valve and the outlet for controlling the rate of flow through the passage when the control valve is open,
 a magnet spaced from the pressure regulator,
 a bimetallic lever having a free end movable in response to temperature changes between an inoperative position in engagement with the magnet and an operative position spaced from the magnet,
 and means including an operating lever operable upon movement of the bimetallic lever from its inoperative to operative position to actuate the control valve to its open position and to cause the pressure regulator to vary the rate of flow through the passage in accordance with temperature changes.

2. A control device comprising in combination;
 a casing having inlet and outlet ports,
 a pressure-responsive movable wall in the casing defining with the casing an expansible and contractable chamber communicating with said inlet and outlet ports,
 a passage extending between said inlet port and a source of fluid pressure,
 a first valve means normally closing said inlet port and being movable to open said inlet port in varying degrees to control rate of flow through said inlet port into said chamber,
 means for moving said first valve means to open said inlet port in response to movement of said wall contracting said chamber, second valve means in said passage having a normally closed position closing said passage and an open position opening said passage to permit fluid flow to said inlet port, actuating means, including a thermally-responsive element, for moving said wall to a first position opening said first valve means when the ambient temperature falls below a pre-determined value and thereafter moving said wall in accordance with temperature changes below said pre-determined value to thereby correspondingly vary the rate of flow into said chamber from said inlet port, said actuating means including means for moving said second valve means to open position simultaneously with the opening of said first valve means when the temperature falls below said pre-determined value.

3. A control device comprising in combination;
a casing having an inlet port and an outlet port,
a pressure-responsive movable wall in the casing defining with the casing an expansible and contractable chamber in communication with said inlet and outlet ports,
a normally closed valve controlling the inlet port and movable to an open position by the movable wall upon contraction of the chamber,
actuating means for moving said wall to contract the chamber to open said valve including a temperature-responsive lever having an inoperative position when the ambient temperature is above a pre-determined value and an operative position causing movement of said wall to open said valve when the ambient temperature falls below said pre-determined value,
holding means for maintaining said lever in its inoperative position,
means including a normally closed control valve controlling fluid flow to the inlet port of the expansible chamber, and
said actuating means including means operatively connected to said lever for opening said control valve when the lever moves to its operative position.

4. A control device comprising in combination a casing having an inlet port and an outlet port,
a pressure-responsive movable wall in the casing defining an expansible and contractable chamber in communication with said inlet and outlet ports and having a normal position,
valve means closing the inlet port when said wall is in its normal position and movable to an open position by the wall when the wall contracts the chamber,
first actuating means for moving said wall in one direction to contract the chamber to open said valve and for restoring said wall to its normal position, said actuating means including,
a lever having a first operative position for moving said wall to contract said chamber to thereby open said valve and a second inoperative position for permitting said wall to be restored to its normal position, and
a temperature-responsive element engageable with said lever to move said lever into the operative position when the temperature falls below a pre-determined value,
means including a normally closed control valve controlling fluid flow from a source to said inlet port, and
control valve actuating means operatively connected to said lever for opening said control valve to permit fluid flow to said inlet port when said lever moves to the operative position upon decrease of the temperature below said pre-determined value.

5. The combination defined in claim 4 wherein there is provided a support,
means pivotally mounting said lever to said support intermediate the ends of said lever,
said first actuating means includes spring means operatively inter-connecting one end of said lever with said wall for moving said wall to contract said chamber when said lever is moved to the operative position thereof, and
said control valve actuating means is operatively connected to the other end of said lever.

6. The combination as defined in claim 4 wherein
said temperature-responsive element has a first inoperative position when the ambient temperature is above said pre-determined value and a second operative position wherein the temperature-responsive element engages said lever to move said lever into operative position when the temperature falls below said pre-determined value, and
there is provided holding means for releasably maintaining the temperature-responsive element in said inoperative position.

7. The combination as defined in claim 6 wherein said holding means is a magnet.

8. A control device comprising in combination,
a casing having inlet and outlet ports,
a pressure-responsive movable wall in the casing defining with said casing an expansible and contractable chamber in communication with said inlet and outlet ports,
a first valve means normally closing said inlet port and movable by said wall to open said inlet port to variably control flow through said inlet port into said chamber depending upon the position of said wall,
a temperature-responsive element having an inoperative position when the ambient temperature is above a pre-determined value and a second operative position when the temperature falls below said pre-determined value,
actuating means including said temperature-responsive element for moving said wall to open said valve when the temperature-responsive element moves out of said inoperative position toward said operative position and to thereafter move said wall and control said valve means to vary flow into said chamber in accordance with temperature changes below said pre-determined value,
means for releasably holding said temperature-responsive element in said inoperative position,
a supply passage communicating with said inlet port,
valve means in said passage movable between open and closed positions to control flow through said passage,
said actuating means including means operatively inter-connecting said second valve means to said actuating means to move said second valve means to open position when said temperature-responsive element moves to said operative position and to thereafter maintain said second valve in open position until said lever returns to the inoperative position.

9. A control device as defined in claim 8 wherein
said first valve means includes a spring acting in one direction to bias said first valve means closed,
said actuating means includes a spring means engaging said movable wall and biasing said movable wall in a direction opposite to said one direction, and a lever pivoted intermediate the ends thereof and having one end positioned between said temperature-responsive element and said spring means to engage said spring means and depress the same to thereby move said wall and open said first valve means when the temperature-responsive element moves into its operative position.

10. A control device comprising in combination,
a body having a flow passage,
first valve means controlling flow through said passage at a first location in the passage,
second valve means controlling flow through said passage at a location downstream of said first location,
said first and second valve means each having open and closed positions respectively permitting and preventing flow through said passage, a thermally-responsive element having a first inoperative position when the temperature is above a pre-determined value and a second operative position when the temperature is below said pre-determined value, a magnet for releasably holding said element in said inoperative position, and means operatively connecting said thermally-responsive element with said first and second valve means to actuate said first and second valve means to said open positions thereof when said element moves to its operative position.

References Cited by the Examiner
UNITED STATES PATENTS

| | | | |
|---|---|---|---|
| 1,729,060 | 9/1929 | Breese. | |
| 2,611,542 | 9/1952 | Crum et al. | 236—68 |
| 2,784,913 | 3/1957 | Wasson | 236—92 |
| 2,876,951 | 3/1959 | Matthews | 236—84 |

WILLIAM F. O'DEA, *Acting Primary Examiner.*

ALDEN D. STEWART, *Examiner.*